(12) United States Patent
Richardson et al.

(10) Patent No.: US 6,745,110 B2
(45) Date of Patent: Jun. 1, 2004

(54) MOTOR VEHICLE TRAJECTORY MEASUREMENT

(75) Inventors: Michael Julian Richardson, Redditch (GB); Philip Alexander Barber, Solihull (GB); Nigel John Clarke, Halesowen (GB); Edward George Hoare, Malvern (GB)

(73) Assignee: Jaguar Cars Limited, Allesley (GB)

( * ) Notice: Subject to any disclaimer, the term of this patent is extended or adjusted under 35 U.S.C. 154(b) by 0 days.

(21) Appl. No.: 10/203,129
(22) PCT Filed: Dec. 11, 2000
(86) PCT No.: PCT/GB00/04727
§ 371 (c)(1),
(2), (4) Date: Nov. 5, 2002
(87) PCT Pub. No.: WO01/57552
PCT Pub. Date: Aug. 9, 2001

(65) Prior Publication Data
US 2003/0135308 A1 Jul. 17, 2003

(30) Foreign Application Priority Data
Feb. 5, 2000 (GB) .............................................. 0002609

(51) Int. Cl.[7] .............................................. G01S 13/93
(52) U.S. Cl. ........................... 701/1; 701/300; 340/435
(58) Field of Search ........................... 701/1, 208, 300, 701/301, 220; 340/435; 348/118, 119; 342/70, 72

(56) References Cited

U.S. PATENT DOCUMENTS

| 5,483,453 | A | * | 1/1996 | Uemura et al. ................. 701/23 |
| 5,530,420 | A | | 6/1996 | Tsuchiya et al. ............. 340/435 |
| 5,901,806 | A | | 5/1999 | Takahashi .................... 180/170 |
| 6,047,234 | A | | 4/2000 | Cherveny et al. ........... 701/200 |
| 6,219,609 | B1 | * | 4/2001 | Matsuno et al. ............... 701/72 |

FOREIGN PATENT DOCUMENTS

| EP | 0 464 821 A1 | 7/1991 | ........... G01S/13/93 |
| EP | 0 715 291 A1 | 11/1995 | .......... G08G/1/137 |
| EP | 0 921 509 A2 | 10/1998 | ............ G08G/1/01 |
| JP | 060138234 A | 5/1994 | ........... G01S/17/88 |
| JP | 08087700 A | 4/1996 | ............ G08G/1/16 |

OTHER PUBLICATIONS

Tsang S. H. et al. "Automotive radar image processing to predict vehicle trajectory" *Proceedings 1999 International Conference on Image Processing*, Proceedings of 6th International Conference on Image Processing in Kobe, Japan on Oct. 24–28, 1999, vol. 3, pp. 867–870.

* cited by examiner

*Primary Examiner*—Michael J. Zanelli
(74) *Attorney, Agent, or Firm*—Davis & Bujold, PLLC

(57) ABSTRACT

The present invention relates to measurement of the trajectory of a motor vehicle with respect to a roadway. A trajectory measurement system for a motor vehicle (1), comprises a sensing system (20, 21) for sensing the positions of roadway edges (5), a memory (24) that stores data relating to the width, and optionally lane width, of different types of road (4) on which the vehicle (1) may travel, and a data processor means (2) linked (26, 29) to the sensing system (20, 21) and memory (24). The processor means (2) compares the sensed positions of roadway edges (5) with the road width data in order to deduce the type of road (4) on which the vehicle (1) travels, and optionally also the lane in which the vehicle travels. The system may also include a vehicle speed sensor (13, 15) linked (33, 35) to the data processor means (2). The memory (24) then stores road speed data relating to different type of road (4) on which the vehicle (1) may travel, so that the processor means (2) can compare also the sensed vehicle speed with the road speed data in order to help deduce the type of road (4) on which the vehicle (1) travels.

9 Claims, 4 Drawing Sheets

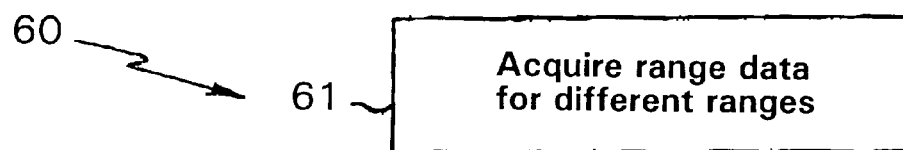
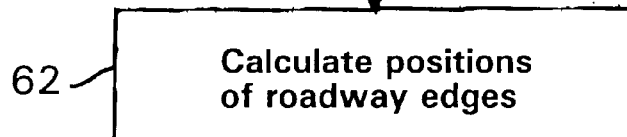
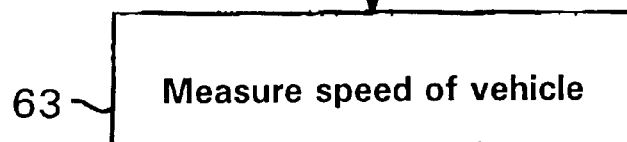
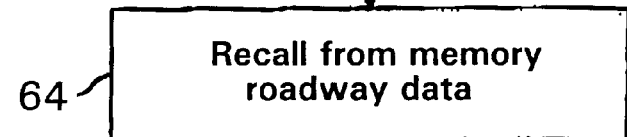
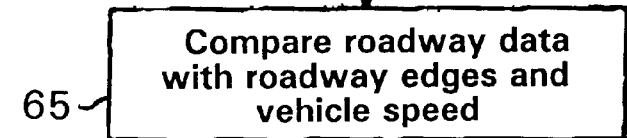
Fig. 6
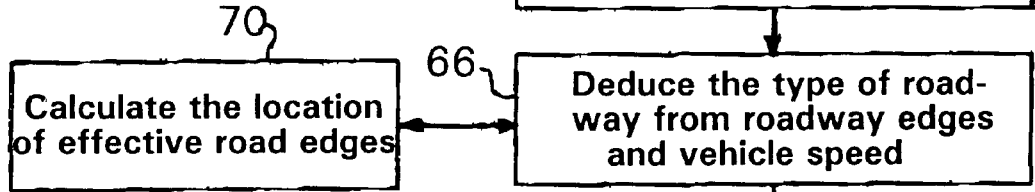
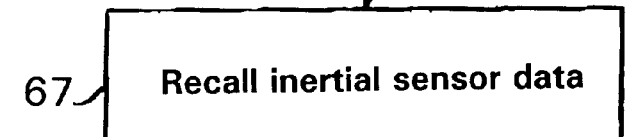
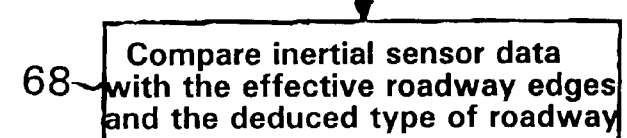
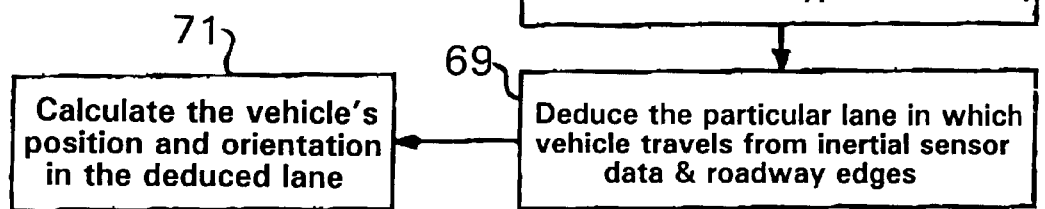

MOTOR VEHICLE TRAJECTORY MEASUREMENT

The present invention relates to the measurement of the trajectory of a motor vehicle with respect to a roadway.

Numerous systems have been proposed for measuring the trajectory of a motor vehicle, for example in collision avoidance or collision warning systems. In one approach, disclosed in EP-A 0 464 821, a vehicle has a forwards directed scanned radar beam that detects the edges of a road. A predicted vehicle corridor or path with respect to the edges of the road is then calculated according to a measured steering angle. It is, however, difficult to make an accurate prediction of a vehicle's path with respect to the actual road edges, and as a result, this prior art document proposes making the prediction as successive stages of approximation, in order to avoid false collision alarms. Furthermore, a detected steering angle may give little useful information if a vehicle's wheels begin to slip.

It is an object of this invention to provide an improved arrangement for the measurement of motor vehicle trajectory.

According to the invention, there is provided a trajectory measurement system for a motor vehicle, comprising a sensing system for sensing the positions of roadway edges, a memory that stores road width data relating to different types of road on which a vehicle may travel, and a data processor means linked to the sensing system and memory, in which the processor means is adapted to compare the sensed positions of roadway edges with the road width data in order to deduce the type of road on which a vehicle may travel.

Also according to the invention, there is provided a method of measuring the trajectory of a motor vehicle, the motor vehicle comprising a sensing system for sensing the positions of roadway edges, a memory that stores road width data relating to different types of road on which the vehicle may travel, and a data processor means linked to the sensing system and memory, in which the method comprises the steps of:
 a) using the sensing system to sense the positions of roadway edges as the vehicle travels on a road;
 b) using the processor means to compare the sensed positions of roadway edges with the road width data, and from this to deduce the type of road on which the vehicle is traveling.

The system and method, therefore, take advantage of the fact that in many areas or countries, roads are built to well-defined standards. For example, in the United Kingdom, a Motorway will have at least two, and up to four lanes in each carriageway. The carriageways are usually side-by-side with a central dividing crash barrier. Almost all sections of Motorway have a paved hard shoulder. The dimensions of the lanes and hard shoulder are very consistent. Many other types of road are similarly well defined.

It is, therefore, possible to use stored information on such roadway standards to help identify the type of road on which a vehicle is traveling. This is useful, because then a path prediction system can make a reliable decision on the number of lanes, and the location of effective edges of the road with respect to the vehicle. The effective edges of the road will normally be at some closer distance than objects detected by the sensor system at the edges of the roadway. Furthermore, if the system predicts that a roadway is not divided, then it is possible to infer that oncoming traffic may be expected in a lane, even if no such oncoming traffic has actually been detected.

The sensing system may include an optical vision system that captures optically a view of the roadway.

Alternatively, the sensing system may include a radar sensor that captures information regarding the roadway. Such a radar system may use a radar transceiver unit mounted in a center forwards portion of the motor vehicle, for example behind a molded plastic bumper panel. The radar transceiver unit may transmit a single lobed beam that is scanned to the left and right of the vehicle center line, or the unit may transmits a plurality of beams arranged at different angles to the vehicle center line.

It is helpful if the trajectory measurement system also comprises a speed sensor for sensing vehicle speed. Road speed can be measured directly from wheel speed sensors as part of a known anti-lock braking system (ABS). The speed sensor is linked to the data processor means and the memory stores road speed data relating to different type of road on which a vehicle may travel. The processor means is then adapted to compare also the sensed vehicle speed with the road speed data in order to deduce the type of road on which a vehicle may travel.

For example, in the United Kingdom, if a vehicle has been traveling consistently at a speed of about 70 mph, which is the national speed limit only for Motorways and certain divided highways, this is a further indication of the type of road on which the vehicle is traveling.

In a preferred embodiment of the invention, the memory stores road lane data relating to different types of road lane in which a vehicle may travel. The processor means is then adapted to compare the sensed positions of the roadway edges with the road lane data to deduce the location of road lanes with respect the sensed edges of the road.

In addition to data relating to road width, speed limits, and lane width and lane position with respect to road edges, the memory may store a variety of other types of data relating to roadway characteristics. For example, the memory means may store typical road layout data applicable within geographical areas in which the vehicle travels. This data may be generalized data relating to national standards for road construction, for example, the type and location of crash barriers, and the typical layout of road junctions, roundabouts, or slip roads. Because many roads in certain countries conform closely to particular national standards, it is not necessary to have an extensive database. This simplifies the task of identifying the type of road, or particular lane, in which a vehicle is traveling.

The memory may be a high capacity solid state memory, or random access storage medium such as a CD-ROM disc or a magnetic hard disc, or any combination of these or other equivalent devices. In general, the roadway may be characterized by data including information about any parameter applicable to a roadway, for example: the road's width; the number of lanes and direction of traffic in these lanes; the width of the lanes and their location with respect to effective road edges; the type and location of crash barriers; the width and type of hard shoulder; and the presence of typical expected fixed obstacles or other hazards that may be detected by the sensing system for sensing the positions of roadway edges, such as lamp poles and bridge abutments.

In general, using a priori knowledge of roadway dimensions and shape makes it easier to determine the dimensions and shape of the roadway, including the width of the roadway, the radius of curves, the location of lanes, hard shoulders, crash barriers and fixed obstacles may all be measured as the vehicle travels on the road. For example, a forward-looking radar or machine vision system may include processing means by which any of the above factors may be determined. The position of a lane in the roadway may be deduced over time from the course the vehicle travels and the measured dimensions and shape of the road. From this, the position and orientation of a vehicle with respect to the roadway may be deduced.

Optionally, the memory may include different sets of roadway related data for different geographical areas or countries in which the vehicle may travels. Means may then be provided by which a driver of the vehicle may select from amongst the different sets of data.

Preferably, the motor vehicle comprises an inertial sensor system for measuring the movement of the vehicle, linked to the processor means. The inertial sensor system may include a number of accelerometers or yaw rate sensors, by which changes in vehicle orientation with respect to a co-ordinate system can be deduced. The processor means may then be adapted to predict from the measured movement of the vehicle a future trajectory of the vehicle with respect at least to the sensed positions of roadway edges, and to calculate therefrom a danger level associated with the predicted future trajectory.

The invention, therefore, also provides a motor vehicle path prediction system comprising the trajectory measurement system and the inertial sensor system, that predicts the trajectory of the motor vehicle with respect to the roadway and which identifies when the predicted trajectory would place the vehicle in danger.

When incorporated in a motor vehicle, such a trajectory measurement system may form part of a collision warning system.

The collision warning system can be linked to the processor means, so that the collision warning system may provide to a driver of the vehicle a collision warning signal when the calculated danger level is above a predetermined threshold.

The path prediction system may be useful with a variety of other systems, for example, a dynamic stability control system that has active control of the braking and/or steering, and that is capable of altering the predicted trajectory by controlling the braking system and/or the steering system in such a way that the identified danger is reduced or eliminated.

The invention will now be described by way of example only and with reference to the accompanying drawings, in which:

FIG. 6 is a flowchart illustrating a method for identifying the type of road, and also the particular lane in which the vehicle is traveling.

Figure 1:
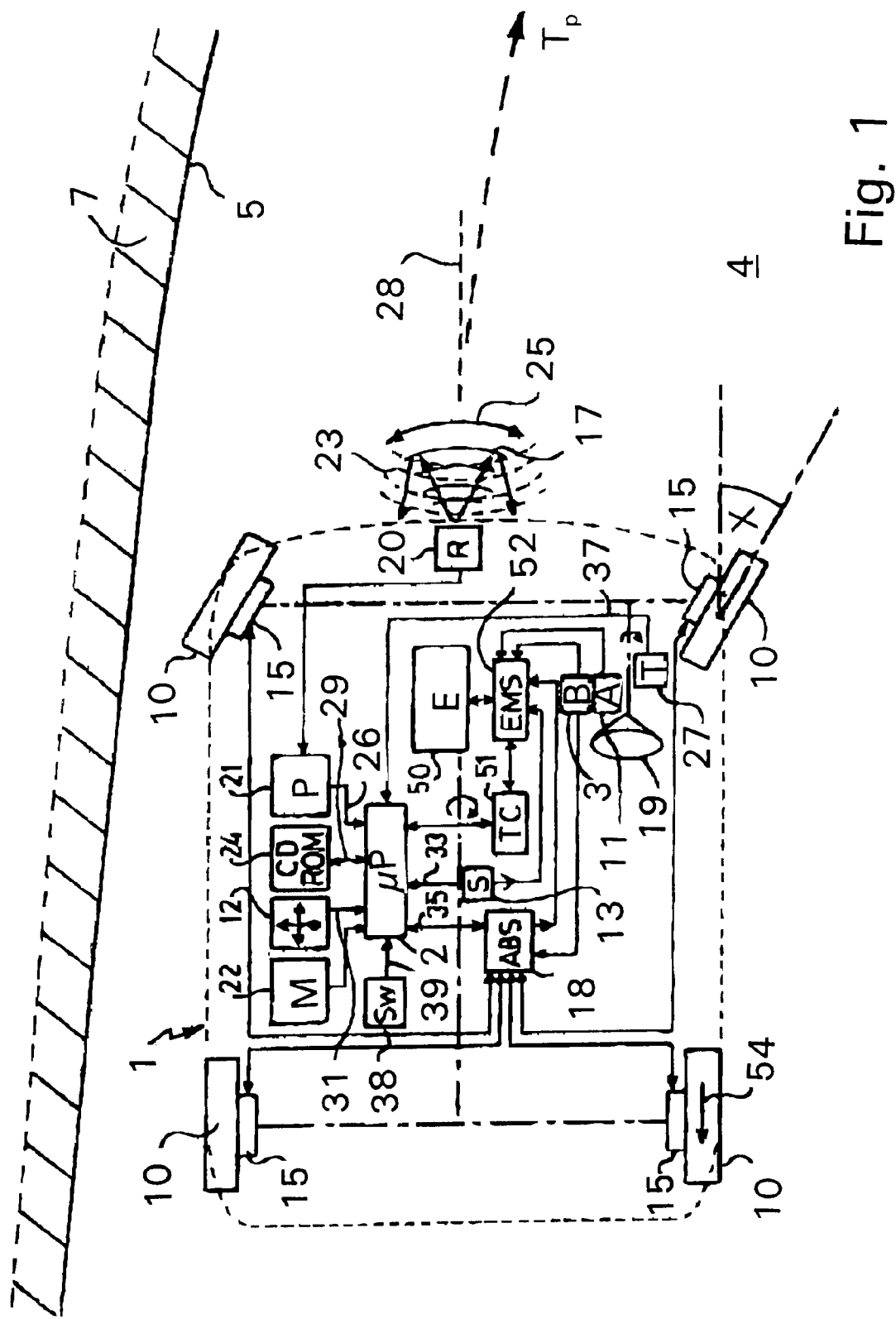
FIG. 1 is a block schematic diagram of a motor vehicle with a trajectory measurement system according to the invention, including a scanning radar transceiver.
Figure 2:
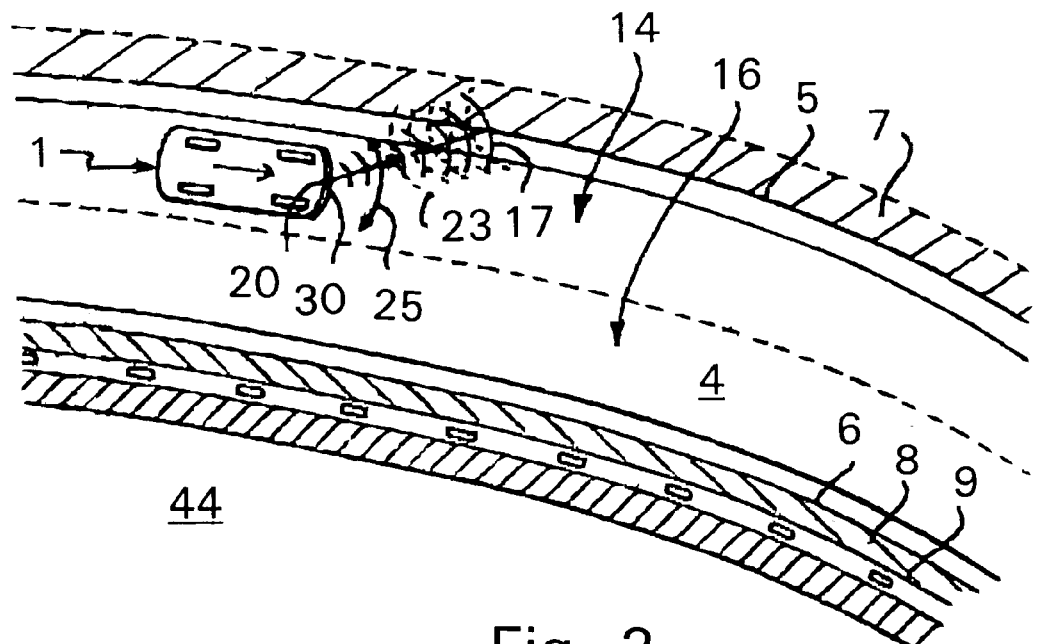
FIG. 2 is a view of the vehicle of FIG. 1 traveling on a divided highway.

FIGS. 1 and 2 show schematically a motor vehicle 1, for example a motor car, having a trajectory measurement system based on a trajectory measurement unit (TMU) 2 that contains a microprocessor ($\mu$P) linked to a random access memory (M) 22. Although the processor 2 has been depicted as a single microprocessor, equivalent processing means may be distributed amongst several systems or modules, for example, as part of an engine management system and a collision warning system.

The vehicle 1 is moving on a road 4. In this example, the road is a divided highway with two lanes having a right-hand curve. Two solid curving lines 5 and 6 show the effective edges of the paved area of the road 4. Beyond the left hand effective edge 5 is a soft gravel shoulder 7, and beyond the right hand effective edge 6 is a grassed strip 8 and then a crash barrier 9. On the opposite side of the crash barrier 9 is a similar carriageway 44 with traffic going in the opposite direction. The vehicle 1 has all four wheels 10 in a left-hand lane 14 of the road 4. The right-hand lane 16 is empty.

The vehicle 1 has a conventional arrangement of driver controls, in particular a brake pedal (B) 3, accelerator pedal (A) 11 and steering wheel 19. The brake pedal 3 is linked to an anti-lock braking system module 18, and the accelerator pedal 11 provides a driver demand signal to an engine management system 52 that controls engine power of an internal combustion engine (E) 50.

Figure 3:
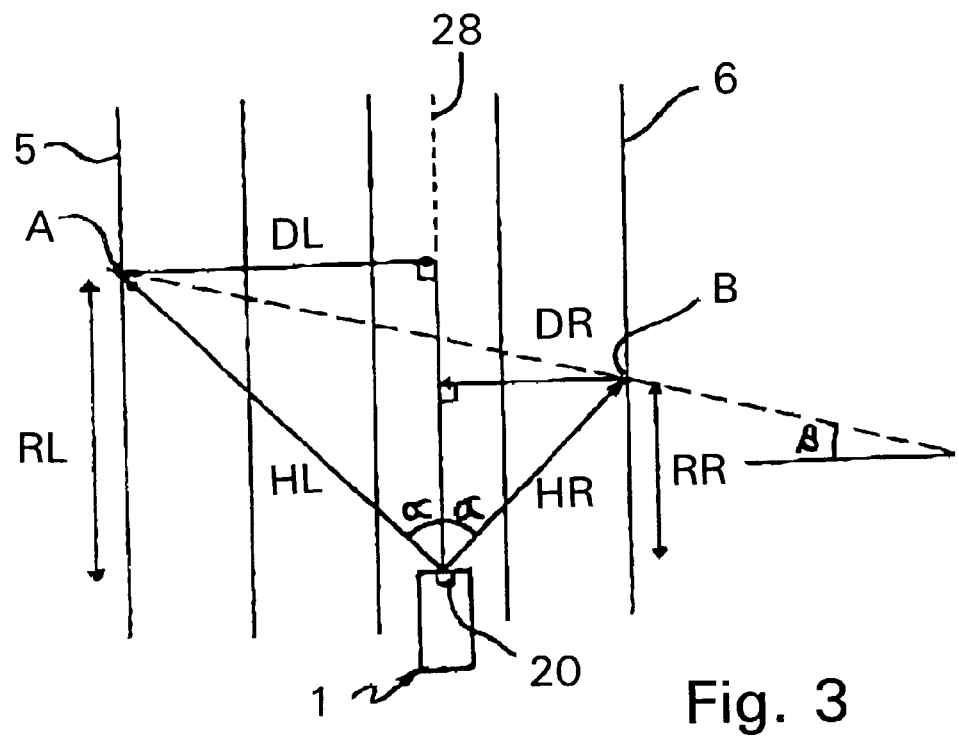
FIG. 3 is a schematic diagram illustrating how range data is obtained of roadway edges from the scanning radar transceiver.

The vehicle 1 has on a vehicle center line 28 inside a molded plastic front bumper 30 a forwards looking radar transceiver module (R) 20 together with an associated radar signal processing unit (P) 21 that provides an input signal 26 to the trajectory measurement unit 2. Optionally, a machine vision system (not shown) may be used in place of the radar system 20, 21. A non-volatile memory in the form of a CD-ROM reader unit 24, connected 29 to the trajectory measurement unit 2, is loaded with a CD-ROM disc (not shown) having road data regarding the roads on which the vehicle 1 may travel, in particular the typical location and strength of roadside radar reflections, total typical effective road widths, the number, width and Radar waves 17 transmitted by the radar transceiver unit 20 are scanned 25 over an angle of ±15° from left to right within about 10 ms. Reflected radar waves 23 from rough areas or discrete objects are received by the transceiver. The strength of such reflected waves 23 at a particular scanned angle can be used to locate the relative separation of such areas or objects with respect to the vehicle. This is shown in FIG. 3, where at the maximum scanned angle of $\pm\alpha$, radar signals are returned from points marked "A" and "B" at respective distances marked HL and HR on roadway edges 5 and 6. The relative separation between point "A" and the transceiver unit 20 in rectangular co-ordinates is given by:

| lateral separation | DL = HL cos($\alpha$) |
|---|---|
| longitudinal separation | RL = HL sin($\alpha$) |

Figure 4:
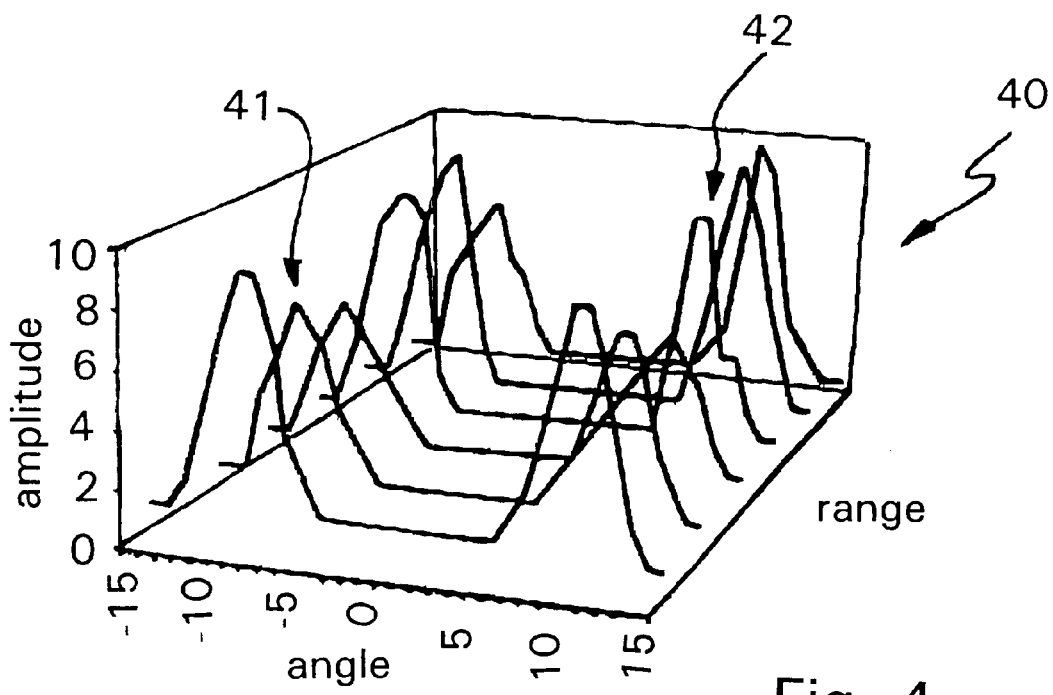
FIGS. 4 and 5 show range data captured using the scanning radar transceiver.
Figure 5:
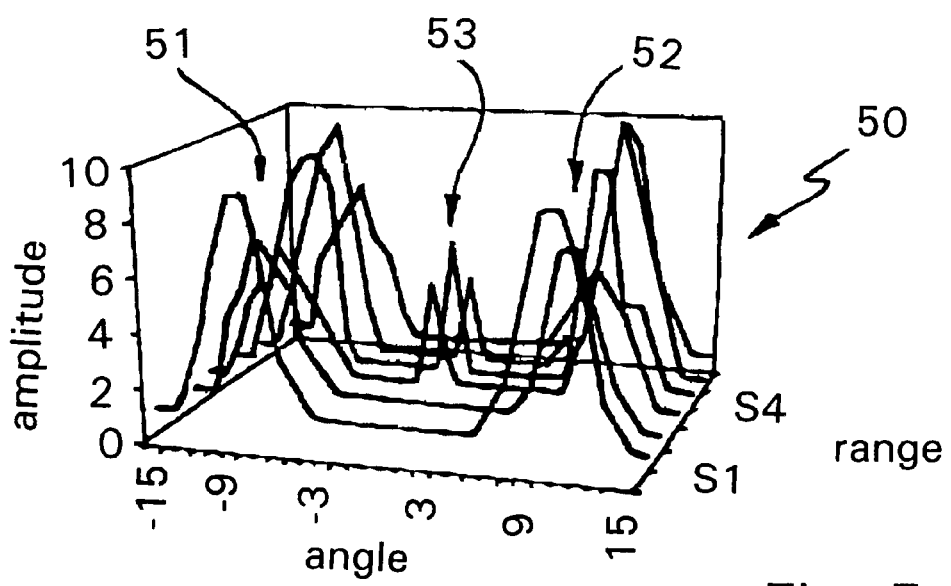

The co-ordinates of point "B" can similarly be worked out. Finally, the angle $\beta$ between the points "A" and "B" can readily be calculated, in order to store complete sets 40,50 of radar data in a rectangular co-ordinate scheme, as illustrated in FIGS. 4 and 5. The complete sets of radar data 40, 50 can be used to derive an average value of road edge reflections as a function of range. These sets show clearly pairs of peaks 41,42;51,52 defining the road edges. Other radar reflections 53 can also be identified. In FIG. 5, these other reflections are from a preceding vehicle. These can be useful in confirming the position of a lane, as such preceding vehicle will tend to stay in either the same lane 14 as the vehicle 1, or in an adjacent lane 16. Similarly, if no vehicle is detected for an extended time in an outside "lane", then this can help identify the road 4 as one having an unoccupied hard shoulder.

The edge peaks 41,42;51,52 can then be averaged in order to generate a more accurate estimate of the road edge. From this, an averaged estimate of the total road width and average distance of the vehicle 1 to roadway edges 5,6 can be calculated. The trajectory measurement unit 2 then recalls from the CD-ROM road data in order to deduce the type of road, and also the lane in which the vehicle is traveling.

The CD-ROM memory 24 stores road related data from a number of countries. Therefore, the vehicle 1 also has a driver operable switch (Sw) 38 connected 39 to the trajectory measurement unit 2 by which a driver may select the country in which he is driving.

FIG. 6 summarizes the method of operation of the trajectory measurement system. First, range data is acquired 61 by the radar transceiver system 20,21. This data is passed 26 to the trajectory measurement unit 2, which then calculates an average detected position of roadway edges 41,42;51,52. The vehicle speed is measured by the speed sensor (S) 13, and passed 33 to the trajectory measurement unit 2, which then compares 65 this information and the detected average positions of the roadway edges 41,42;51,52 with roadway data recalled 64 from the CD-ROM 24, to deduce 66 the type of roadway on which the vehicle 1 is traveling. From this, the location of the effective road edges 5, 6 may be calculated 70.

The trajectory measurement unit 2 also receives 31 from the inertial sensors 12 data regarding the movement and attitude of the vehicle 1. This is then compared 68 with the effective roadway edges 5,6 and type of roadway to deduce 69 the particular lane 14 in which the vehicle 1 is traveling, and also to calculate 71 the vehicle's position and orientation in the deduced lane 14.

The trajectory measurement unit 2, in addition to deducing the position and orientation of the vehicle 1 with respect to the road 4, and then assesses the surrounding danger level. To do this, the unit 2 receives a number of inputs from movement sensors, specifically an input 31 from accelerometer and yaw rate sensors 12, an input 33 from a propeller shaft speed sensor (S) 13, and, via the anti-lock braking system (ABS) module 18, an input 35 from four wheel speed sensors, one on each wheel 10 as part of four ABS disc brake units 15. The various movement sensors 12,13,15 together provide an accurate measure of the vehicle's velocity and attitude.

Optionally, vehicle speed data from the propeller shaft sensor 13 or the ABS wheel speed sensors 15 may be used by the trajectory measurement unit 2 and compared with road speed data retrieved from the CD-ROM in order to help determine the type of road or lane in which the vehicle 1 is traveling.

Once the vehicle trajectory unit 2 has deduced the position and orientation of the vehicle 1 with respect to the effective road edges 5,6 and lanes 14,16, it assigns danger levels to various co-ordinate points along the road particularly towards and beyond the road edges 5,6.

Once the vehicle's position and orientation with respect to the road 4 are known, the next step is to predict the trajectory $T_P$ of the vehicle 1 with respect to the road 4. Because steering angle "x" will affect the future movement of the vehicle 1, a steering angle sensor (T) 27 provides an input signal 37 to the vehicle trajectory unit 2. This together with the calculated position, orientation, velocity and yaw rate of the vehicle permits the dynamic stability unit 2 to calculate the predicted trajectory $T_P$ of the vehicle with respect to the road 4. Here, the predicted trajectory $T_P$ will not take the vehicle 1 off the left-hand edge 5 of the road, and so the trajectory is not identified as one that would place the vehicle in danger.

It is therefore possible to obtain an accurate basis for determining the vehicle's position and orientation with respect to the road, and the likelihood that the vehicle's trajectory will place the vehicle in danger.

What is claimed is:

1. A measurement system for a motor vehicle comprising:
   a sensing system for sensing the positions of roadway edges,
   a memory that stores road width data relating to different types of road on which a vehicle may travel; and
   a data processor means linked to the sensing system and memory, in which the processor means is adapted to compare the sensed positions of roadway edges with the road width data in order to deduce the type of road on which a vehicle may travel.

2. The measurement system according to claim 1, comprising a speed sensor for sensing vehicle speed, the speed sensor being linked to the data processor means, in which the memory stores road speed data relating to different types of road on which a vehicle may travel, in which the processor means is adapted to compare also the sensed vehicle speed with the road speed data in order to deduce the type of road on which a vehicle may travel.

3. The measurement system according to claim 1, in which the memory stores road lane data relating to different types of road lane in which a vehicle may travel, in which the processor means is adapted to compare the sensed positions of the roadway edges with the road lane data to deduce the location of road lanes with respect the sensed edges of the road.

4. A motor vehicle, comprising an inertial sensor system for measuring the movement of the vehicle and a measurement system as claimed in claim 1, the inertial sensor system being linked to the processor means, in which the processor means is adapted to predict from the measured movement of the vehicle a future trajectory of the vehicle with respect at least to the sensed positions of roadway edges, and to calculate therefrom a danger level associated with the predicted future trajectory.

5. The motor vehicle according to claim 4, in which the processor means is adapted to predict from the measured movement of the vehicle the future trajectory of the vehicle with respect to a deduced location of road lanes, and to calculate therefrom a danger level associated with the predicted future trajectory.

6. The motor vehicle according to claim 4, comprising a collision warning system, the collision warning system being linked to the processor means, in which the collision warning system provides to a driver of the vehicle a collision warning signal when the calculated danger level is above a predetermined threshold.

7. The motor vehicle according to claim 4, in which the memory includes different sets of roadway related data for different geographical areas or countries in which the vehicle may travel.

8. The motor vehicle according to claim 7, in which means are provided by which a driver of the vehicle may select from amongst the different sets of data.

9. A measurement method for a motor vehicle, the motor vehicle comprising a sensing system for sensing the positions of roadway edges, a memory that stores road width data relating to different types of road on which a vehicle may travel, and a data processor means linked to the sensing system and memory, in which the method comprises the steps of:
   a) using the sensing system to sense the positions of roadway edges as the vehicle travels on a road;
   b) using the processor means to compare the sensed positions of roadway edges with the road width data, and from this to deduce the type of road on which the vehicle is traveling.

* * * * *